United States Patent [19]
Yarwood

[11] Patent Number: 6,161,016
[45] Date of Patent: Dec. 12, 2000

[54] BROADCAST CHANNEL SEIZURE WITH ALLOCATED SINGLE TRAFFIC CHANNEL PER OCCUPIED CELL IN A CELLULAR SYSTEM

[75] Inventor: Anthony Charles Yarwood, Ipswich, United Kingdom

[73] Assignee: British Telecommunications public limited company, London, United Kingdom

[21] Appl. No.: 08/553,431
[22] PCT Filed: May 23, 1994
[86] PCT No.: PCT/GB94/01123
§ 371 Date: Jan. 16, 1996
§ 102(e) Date: Jan. 16, 1996
[87] PCT Pub. No.: WO94/28687
PCT Pub. Date: Dec. 8, 1994

Related U.S. Application Data

[63] Continuation-in-part of application No. 08/179,961, Jan. 11, 1994.

[30] Foreign Application Priority Data

May 21, 1993 [GB] United Kingdom .................... 9310634
Sep. 28, 1993 [EP] European Pat. Off. .............. 93307663

[51] Int. Cl.[7] ...................................................... H04Q 7/20
[52] U.S. Cl. .......................................... 455/445; 455/560
[58] Field of Search ................................... 455/445, 517, 455/554, 555, 524, 428, 432, 435, 560

[56] References Cited

U.S. PATENT DOCUMENTS

| | | |
|---|---|---|
| 4,287,599 | 9/1981 | Goncharoff et al. . |
| 4,415,770 | 11/1983 | Kai et al. ................................ 455/56.1 |
| 4,698,805 | 10/1987 | Sasuta et al. . |
| 5,257,399 | 10/1993 | Kallin et al. ............................ 455/33.1 |
| 5,263,176 | 11/1993 | Kojima et al. ............................ 455/62 |
| 5,301,359 | 4/1994 | Van den Heuvel et al. . |
| 5,335,350 | 8/1994 | Felderman et al. . |
| 5,349,342 | 9/1994 | Nilles et al. . |
| 5,355,515 | 10/1994 | Sicher . |
| 5,475,862 | 12/1995 | Sawyer .................................. 455/33.1 |

FOREIGN PATENT DOCUMENTS

| | | |
|---|---|---|
| 0549054 A1 | 6/1993 | European Pat. Off. . |
| 3130408 A1 | 2/1983 | Germany . |
| 2075799 | 11/1981 | United Kingdom . |

OTHER PUBLICATIONS

Coudreuse et al, Systemes De Radiocommunication Mobile A Ressources Partagees TN10 — TN100 — TN200, Commutation & Transmission 11 (1989), No. 2, Paris, FR, pp. 39–50 and translation.

*Primary Examiner*—Reinhard J. Eisenzopf
*Assistant Examiner*—Sam Bhattacharya
*Attorney, Agent, or Firm*—Nixon & Vanderhye P.C.

[57] ABSTRACT

In a cellular radio system the facility is provided for a call to be broadcast from a control center (for example an emergency service controller), or from any mobile unit to all of the others. Each cell allocates a single channel to the broadcast service, irrespective of the number of mobile units in the cell. This allows more efficient use of the available channels than the use of a separate channel for each mobile unit. In one embodiment no channel is allocated to a cell unless at least one mobile unit responds to a paging signal in that cell. Paging may continue throughout a broadcast call to allow a channel to be allocated when a mobile unit enters a previously unoccupied cell or to allow release of a channel should all mobiles leave a previously occupied cell. The broadcast facility can be provided on a cellular network which also supports other mobile units which do not receive the broadcast service, and whose operation is not affected by it.

14 Claims, 1 Drawing Sheet

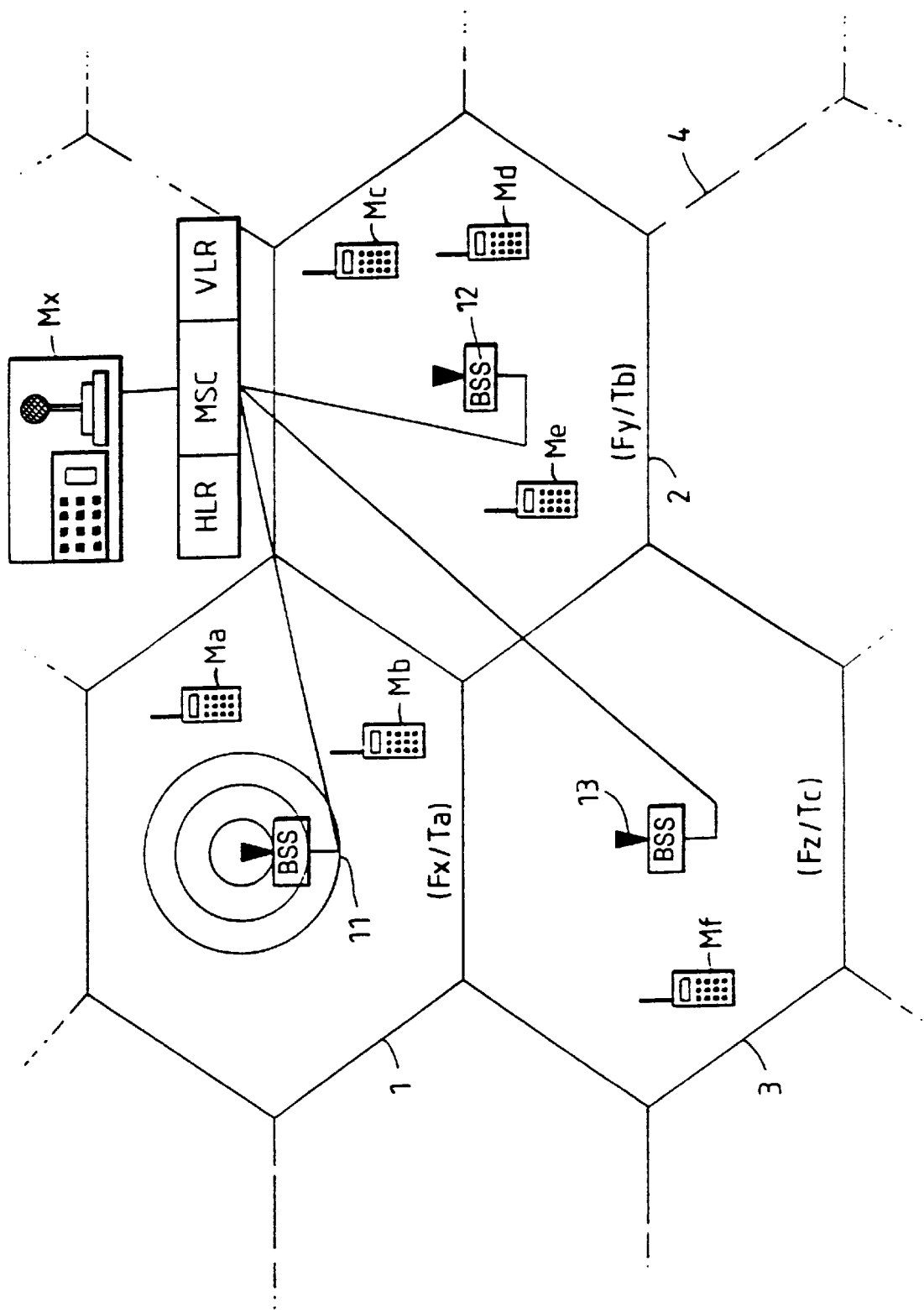

BROADCAST CHANNEL SEIZURE WITH ALLOCATED SINGLE TRAFFIC CHANNEL PER OCCUPIED CELL IN A CELLULAR SYSTEM

CROSS-REFERENCE TO RELATED APPLICATION

This application is a continuation-in-part of our copending commonly assigned application Ser. No. 08/179,961 filed Jan. 11, 1994.

BACKGROUND OF THE INVENTION

1. Field of the Invention

This invention relates to cellular radio systems.

2. Related Art

A typical cellular radio system includes a number of base stations linked together to form a network, the base stations being under the control of a mobile switching center which can also have a connection to a fixed network. Each base station has one or more antennas for providing radio coverage within an area around the base station. This area is known as a cell. Each base station is capable of radio communication with a number of mobile units operating in its cell.

In order to set up a call to a mobile unit, the mobile switching center sends out a paging signal to all the base stations. If the mobile unit which is being paged responds, the base station which receives the response allocates a channel, from a number of channels available to it, for communication with the mobile unit.

In a conventional cellular radio system a mobile unit does not hold on to the same resource (radio channel) throughout its call. As the mobile progresses from one cell to another within the network, handover from a resource in the old cell to another resource within the new cell is performed by switching to a new channel. This allows the mobile unit to roam over specific geographic areas without significant interruption to the communication path, while allowing re-use of released resources by other mobile units. Existing cellular radio systems are designed for use by individual mobile units making and receiving calls on a one-to-one basis, so that a mobile unit can be connected to one other mobile unit on the cellular network, or to one terminal on an interconnected fixed network (eg PSTN). When a call is set up, the mobile unit is assigned a channel (defined by e.g frequency and/or timeslot) which, for the duration of the assignment, only that mobile can use.

For some purposes, in particular in the emergency services (ESs) such as fire, police, ambulance, coastguard, mountain rescue etc., there is a requirement for a control center (the "dispatcher") to be able to call to all mobile units simultaneously (known as a "broadcast" service) or for one mobile unit to call all the others (an "all-informed" service). However, these services require access to these facilities for only a small proportion of their operational requirements. It is thus wasteful of resources to devote equipment and spectrum in the radio band exclusively to the provision of such services. Other services with field forces such as taxi and public transport operators, utilities such as gas and telecommunications companies, and dispatch companies, also have a need to communicate with several members of the field force at once.

Many of these services' other communication requirements can be met by existing cellular systems. For example, existing systems allow calls to be made between an individual mobile unit and the dispatcher, initiated by either party. However, existing cellular radio systems do not meet the requirements for the "broadcast" or "all-informed" service. It would be especially advantageous to support the requirements of the emergency services on a cellular system, because the emergency services' existing private networks have to have a high capacity to allow the system to cope with extreme situations, but this capacity is rarely required, and the system is generally under utilized.

Some cellular systems offer a supplementary service known as "multi-party calling" or "conference calling". This would allow a number of mobiles to communicate with the dispatcher and each other simultaneously. Call set-up can be initiated by any of the participants. However, multi-party calling presents some operational restrictions for the emergency services. In particular there is the need to set up calls individually; with the inherent time overhead, and the requirement for separate radio resources to be devoted to the system for each member of the multi-party call, which is wasteful of physical resources and can lead to capacity problems.

By the nature of their duties, the emergency services often have to deploy a large number of resources into a small area. This can put a heavy demand on the resources of the local base station of a cellular system if each unit requires its own channel. The base station might not be capable of meeting these capacity requirements, even if the emergency service mobiles are given priority over all other users. The nature of emergencies makes normal cell enhancement methods unsuitable for coping with these unpredictable sudden high demands.

SUMMARY OF THE INVENTION

According to a first aspect of the invention, there is provided a cellular radio system comprising a switching center and a plurality of radio base stations each having an associated plurality of traffic channels for servicing an associated cell, and a plurality of mobile units, characterized in that for each of a plurality of the radio base stations one of the associated channels can be dedicated to a broadcast service, and a selected group of at least some of the mobile units each have means for establishing the channel associated with the broadcast service, so that a call from the switching center can be transmitted by a base station over the dedicated channel to the selected group of mobile radio units within the respective cell.

In one embodiment of the invention, each base station within the cellular system has a channel permanently dedicated to the broadcast service. In an alternative embodiment each base station comprises means for transmitting a paging signal, each mobile unit of the selected group having means for transmitting a response to the paging signal, and means for dedicating a channel to the broadcast service at only those base stations which receive one or more such responses.

According to a second aspect of the invention, there is provided a cellular radio system comprising: a switching center and a plurality of radio base stations each having an associated plurality of traffic channels for serving an associated cell, and a plurality of mobile units, characterized in that for each of a plurality of the radio base stations one of the associated channels can be dedicated to a broadcast service, and a selected group of at least some of the mobile units each have means for establishing the channel associated with the broadcast service, so that a call from the switching center can be transmitted by a base station over the dedicated channel to the selected group of mobile radio units within the respective cell, each base station comprising means for transmitting a paging signal and means for dedicating a channel to the broadcast service at only those base stations which receive one or more responses to the paging signal, each mobile unit of the selected group having means for transmitting such a response to the paging signal.

In this arrangement, it is advantageous to provide means for repeating the paging signal periodically throughout a broadcast. It can be arranged that the channel dedicated to the broadcast service may then be released if no mobiles continue to respond to the repeated paging signal in a particular cell. Moreover, it can be arranged that a channel to be allocated part of the way through a broadcast if a mobile enters a cell in which there are no others already present.

The plurality of base stations from which the broadcast service can be transmitted may be selected according to the area of coverage required, for example administrative district covered by the user of the broadcast service.

In a preferred embodiment there is the facility for a broadcast to be initiated from one of the mobile units, to provide the "all-informed" service described above. The term "broadcast" as used in this specification hereinafter embraces such a service.

Means may be provided for supporting a plurality of broadcast services to different groups of mobile units, arranged such that for each of a plurality of the base stations one of the associated channels can be allocated to each broadcast service. This allows several broadcast services for different user groups to be supported at once. Different groups of the base stations may support different groups of the broadcast services to allow for different but overlapping geographical coverage requirements.

For some embodiments the use of conventional mobile radio handset units may be possible. For example, in systems in which broadcast service is initiated by paging, the units may have means to allow them to respond to a special broadcast service paging signal, but alternatively, the system may simply identify the unit as being one subscribing to the broadcast service by matching its identification code with, for example, an additional look-up table in that part of the system which identifies whether a mobile unit is authorized to use the cellular network. However, for many of the preferred arrangements, described below, specially adapted radio units may be required.

In an embodiment in which a single channel is permanently allocated to the broadcast system, it is advantageous for mobile radio units for use in that system to have means to monitor the broadcast channel while they are operating on another channel, (e.g. in normal cellular mode), and are arranged to switch to the broadcast channel if traffic is detected on that channel. Where a broadcast may be initiated from one of the mobile units, it is advantageous for the units to include means for inhibiting transmission by the unit on the broadcast channel if other traffic is detected on that channel, to ensure that only one unit is broadcasting at a time. Moreover, if the unit were to continue receiving at the same time as it is transmitting on the broadcast channel echo effects and/or feedback howl could be caused. It is therefore advantageous to include means for inhibiting reception by the unit when it is transmitting on the broadcast channel.

BRIEF DESCRIPTION OF THE DRAWINGS

Preferred embodiments of the invention will be described with reference to the drawing, which schematically represents a cellular radio system of the embodiment of its coverage area for broadcast purposes.

DETAILED DESCRIPTION OF EXEMPLARY EMBODIMENTS

This coverage area consists of three cells, (Cell 1, 2 and 3) which form part of a larger cellular network (indicated by dotted lines in the figure). In each cell, there is a base station system (BSS) for establishing radio contact with the mobile units (Ma, Mb etc) within the cell.

A mobile switching center (MSC) controlling the cellular network has associated with it a home location register (HLR) and visitor location register (VLR) as is conventional in cellular systems such as the GSM Pan-European digital cellular system.

The operator of the broadcast service, typically a dispatcher for an emergency service, has a control point which has a link to the Mobile Switching Center. The control point may be co-located with the mobile switching centre, but will usually be elsewhere.

The two embodiments to be described with reference to the drawing differ in the method by which channels are allocated to support the broadcast service. The first uses a fixed or dedicated broadcast channel, and the second uses a flexible broadcast channel allocation.

These broadcast channels must not be confused with a broadcast control channel, in GSM known as BCCH; which provides control signalling information for the cellular network as a whole. In particular, the broadcast control channel provides the paging function required in order to identify the location of a mobile unit when an incoming call for that unit is made. These control channels are merely signalling channels carrying signalling data. The broadcast channels in this invention are additional to this, and in normal circumstances carry speech.

In the FIGURE the three cells 1, 2 and 3 represent the coverage area in which the mobiles subscribing to the broadcast service are intended to operate. They might, for example, represent the area covered by a single police force. The network as a whole may provide broadcast services for more than one service, for example, police forces in adjacent areas. Moreover, different emergency services may have their own broadcast services within the same area, or overlapping areas, each one being allocated its own channel, or its own paging signalling. Each of the cells 1, 2 and 3 has a base station, identified as 11, 12 and 13 respectively and there are a number of mobile units identified Ma, Mb, Mc, Md, Me and Mf which can roam throughout the cellular network. The dispatcher or control point is identified by Mx.

Considering the fixed broadcast channel embodiment first, each base station has an allocated emergency channel, having a specified frequency (Fx, Fy, Fz) and time slot (Ta, Tb, Tc). A mobile unit forming part of the broadcast system will be set to continually monitor this channel. The mobile units can also operate in the same way as normal mobile units, ie. they are able to make and receive point to point calls. As mobile units (Ma–Mf) roam through the policing area, each unit monitors the respective broadcast channel for the cell it is in. The broadcast channel is identified over the broadcast control channel, which a mobile unit normally monitors for paging information and other control data, so that as the mobile unit passes from one cell to another the broadcast control channel information will direct it to monitor the broadcast channel of the new cell. Alternatively instead of being directed by the control channel, the mobile unit may be arranged to tune to the broadcast channel offering the best level of quality, ie. the highest signal level.

When the dispatcher at control point Mx is required to make a broadcast, he selects the broadcast area in which he wishes the call to be made (which may be just one cell, or all cells, or any subset of the whole), and then broadcasts the message. Those mobile units in their idle state are already tuned to the broadcast channel in the selected areas, so they are immediately capable of receiving calls. Any mobile units involved with point-to-point calls are informed that a broadcast call is starting so that they can also tune to the broadcast channel. This broadcast call indication can be arranged to cause any such point-to-point calls to be terminated automatically, or it may allow the user operating the mobile unit to select whether to listen in to the broadcast call or continue with the point-to-point call.

When the broadcast is finished, the dispatch centre will release the call, and the mobile unit returns to monitoring the broadcast channel.

Normally mobiles in a cellular system are required to perform a location update when entering a new location area or at predetermined intervals. Location areas are specified by the network operator and location area information is broadcast to all mobiles over the broadcast control channel. The mobiles normally retain location information and compare it with subsequently received information to determine whether a location update is required. In particular, if the location information broadcast over the broadcast channel has changed, this is indicative that the mobile unit is now within range of a different base station.

The handover process for the broadcast channel operates entirely within the mobile unit, which determines which cell is going to provide the best level of service, based on measurements either of the broadcast channel or of the control channel taken within the mobile unit. If the mobile unit roams outside the broadcast area altogether (ie. in FIG. 1 outside cells 1, 2 and 3, for instance into cell 4) then it will drop out of any broadcast call.

The mobile unit may of course still communicate with its own dispatcher (or any other dispatcher) by virtue of still being within the conventional cellular network. This is an advantage over existing private mobile systems, which have no out-of-area capability.

A mobile unit, on performing location update, will pass its identity to the network, which is then used to determine the home location register (HLR) address to which the VLR (Visitor Location Register) has to pass the location update information. The Home Location Register, on receiving the update, will pass service information back to the new VLR and delete all previous entries for that mobile at any previous VLR.

Where a generic broadcast identity is used the emergency service mobiles should not use it for location updating, instead they use their own specific identity. The HLR has a permanent VLR address entry stored in it for the broadcast service which covers the broadcast area, i.e. there is a fixed relationship between the broadcast area and the broadcast identity, VLR and HLR. Generally, all the information is pre-stored in the HLR without any need to download to the VLR.

The broadcast areas can be tailored to fit the individual Emergency or other Service operating areas. This has the advantage of reducing location update information and provides a means of indicating to the mobile that it is out of the broadcast coverage area, and reducing the signalling overhead by not transmitting paging signals in those cells where a mobile unit should not be found. The area may be an administrative district, such as a Police Authority's jurisdiction, or may be selected according to the nature of the user; for example limiting the broadcast to only those cells covering the routes operated by a public transport operator.

The cellular system can support conventional mobile units (not equipped to monitor the emergency channel) without modification. The presence of the emergency channel will have no effect on these units whatsoever.

If it is desired to use encryption in the broadcast channel, a facility which is particularly useful for the emergency services, this can be provided comparatively easily in the fixed channel system. The encryption algorithm may be carried out over the air interface, for example to allow the fixed channel allocated to be changed on a predetermined basis known only to the operating system and encryption software in the mobile units. Alternatively, the emergency services may prefer to run their own encryption algorithm end to end, with no further encryption over the air interface.

Although the fixed broadcast service describe above has a number of advantages, a particular disadvantage with providing such a system is that resources (in particular a radio channel) have to be permanently reserved within each cell in the broadcast area whether or not they are actually being used. The flexible option now to be described moves away from a permanent, fixed allocation, to one which is demand allocated. This allows more efficient use of the resources in the broadcast area, at the expense of some greater complexity. Since emergency services in particular are likely to be allocated the highest degree of priority there should be no problems in making a channel available for the broadcast service, even if this means an existing point-to-point call has to drop out.

To provide a flexible broadcast channel each mobile unit is allocated two identifies; namely the unique identity which can be used for individual calls, as a standard cellular mobile unit, and an operational group identity for broadcast calls.

The basic operation of the mobile unit remains the same as in standard cellular practice in that the mobile unit is able to make and receive point-to-point calls. To set up a broadcast call a broadcast group identity is paged by all the base stations 11, 12, 13 in the broadcast area. Each mobile unit operating in the broadcast area which has that broadcast group identity responds to the base station as to a normal page. The first unit in each cell to respond is allocated a channel e.g. (Fx/Ta in Cell 1). Should there be another mobile unit in the same cell (e.g. Mb), it is instructed to tune to the same channel. In this way only one channel is required for each cell, as in the previous embodiment. However, unlike the previous embodiment, if no mobile responds in a particular cell, no channel is allocated in that cell.

This approach is more efficient in use of resources than the fixed mode, because it only requires the use of a channel in those cells in which there are mobile units subscribing to the broadcast system.

If, at the time of paging, one of the emergency service mobiles is engaged on a point-to-point call, that call will be terminated. The channel allocated to that call can then be used for the broadcast service. If no emergency service mobile is currently engaged on a point-to-point call a free channel is allocated, or if none are free, one is seized from a lower-priority call. Ideally, a warning message will warn the callers that this is about to happen, and why.

Once the physical channel has been determined, the base station will set up a connection to the mobile switching center. Each base station involved in the broadcast area is connected to the dispatch center Mx via the switching center MSC, where there will be a multiple connection conference bridge for interconnecting the traffic service to the dispatcher. This conference bridge does not need to be as complex as it would be for a conference between all the mobiles working independently in a conventional manner, since only one connection to the bridge per base station instead of one per mobile is needed.

The mobile units have their transmitters disabled while the service is running, so a base station will not get any information on the unlink from the mobile unit. This means that the mobile will not receive any power control or timing advance information.

When the broadcast facility is no longer required, the dispatcher releases the call which stops the paging and releases the resources at each cell in the broadcast area. The mobile units can then resume normal cellular operation.

In this second embodiment, handover arrangements are somewhat different from those in the first embodiment. As a mobile unit, for example Mb, moves from the coverage of the broadcast channel in cell 1, it will normally drop out of the broadcast group in that cell. This drop out decision is taken by the mobile unit and is based on quality of service measurement. Conventional handover techniques cannot be used in this situation, because in the broadcast service the movement of a mobile between cells does not necessarily require the allocation of a new channel in the new cell or the release of one in the old cell (as it would in a conventional handover) since other mobiles may be present in either or both cells. Instead, the paging procedure is repeated at intervals throughout a broadcast call. Should a mobile respond in a cell to which no channel is currently allocated (i.e. it has entered an empty cell) a channel will be allocated. A mobile unit may miss initial page attempts for the broadcast service, but an appropriate repetition rate will minimize the level of speech loss which could occur while the mobile is finding the new channel. This handover process can be speeded up by using the broadcast control channel to broadcast the physical channel data for each active cell in the broadcast group to the mobiles.

If no mobiles respond to a page repetition from a base station then it may be assumed that there are no longer any mobiles in the cell and the channel can be released. However, because of the possibility that a mobile is still in the cell but has missed a paging attempt the channel is only released after a number of successive paging attempts fail to get a response.

When the broadcast facility is no longer required then the broadcast center releases the call which stops further pages and releases the resources at base stations and mobiles.

The location management is similar to that in the fixed channel embodiment described above.

Encryption may be provided in the flexible broadcast embodiment in the same manner as described under the fixed channel embodiment described above. Alternatively there may be a more flexible approach, more in tune with the way in which conventional cellular systems operate.

This approach requires that the broadcast service mobile units Ma to Mf are first authenticated over a dedicated signalling resource before the mobile is permitted to move to the shared physical channel. In much the same way as in standard cellular radio encryption systems the encryption key is generated from a random number during the authentication process. The mobile responds to the visitor location register with a response which is then checked before encryption begins. However, it must be noted that all elements in the system have to use the same random number and generate the same encryption key for each mobile in a serving cell so that they can share the same physical channel. The allocation of the special group identity must also be supported by the same allocation of a secret key, otherwise a different response will be returned to the VLR and a different encryption key generated for each member of the group.

There may be a requirement to provide the broadcast service in specific geographical areas, for example different police force areas. This could be provided through tailoring of the paging to certain base stations only. In general the paging area is pre-defined by the operator and managed by the VLR. This means that for all calls, the same base stations are used for paging. If, however, a link is made between the mobile station identity and the paging area in the VLR it would be possible for an operator to provide paging for specific identities only when they are in specified areas. Thus the flexible mobile system has the advantage of being a more efficient use of channel resources in the cellular radio system, at the expense of some complexity and a slower response time for call set-up and handover.

Either system described above can support an "all-informed" service, in which a message from a mobile Ma can be heard by all others. The call set-up is as described above, except that it is initiated from mobile Ma instead of the control point Mx. Mobile Mb will therefore be allocated the same channel as Ma because it is in the same cell. In order to avoid the delayed speech being heard by the speaker, the mobile Ma making the transmission must have reception inhibited. The mobile units Ma, Mb, Mc, Md, Me, Mf are designed so that transmission is inhibited if any traffic is detected on the channel, so that only one mobile can transmit at once.

The mobile unit must determine a timing advance, in order to transmit on the up-link portion of the broadcast channel. A random access burst is passed to the base station on the uplink of the broadcast channel, and a timing correction is calculated and passed to the mobile by means of the downlink portion of the broadcast channel. Once timing correction has been attained the mobile unit can then transmit. The transmitting mobile's speech can be retransmitted in the downlink broadcast channel provided that a conference facility is available in the operational control room. The mobile which is transmitting must inhibit its own receiver to prevent reception of its own speech after a time delay. While the mobile is transmitting on that channel the other mobile units are inhibited from making broadcasts because traffic is detected on the channel. This can be achieved most easily by providing a "press to talk" button on the mobile unit. The "press to talk" button will allow the mobile unit to transmit (provided that no other mobile or the dispatcher is already transmitting on the channel) and inhibit reception.

One mobile switching center could support more than one broadcast network, which may cover different broadcast areas (e.g. different police authorities) or may have overlapping broadcast areas (e.g. fire, police and ambulance services within the same area).

The invention therefore allows a broadcast facility to be provided to or between a number of mobile units within a cellular system. General traffic can be carried on the same system in a conventional manner.

Although the broadcast service has been described with reference to use by the emergency services, the facility could also be provided for other users who require similar facilities such as taxi operators, parcel couriers, railway operators etc.

What is claimed is:

1. A cellular radio system comprising:

a switching center and a plurality of radio base stations, each having an associated plurality of traffic channels for serving an associated cell, a plurality of mobile units, each of a plurality of the radio base stations having at least one of its associated channels capable of being dedicated to a broadcast service, and a selected group of at least some of the mobile units each having means for establishing the channel associated with the broadcast service, so that a call from the switching center can be transmitted by one of said base stations over the channel associated with the broadcast service to the selected group of mobile units within the cell, each base station including means for transmitting a paging signal as part of an initial call set-up and handover process and periodically throughout a broadcast call as part of a handover process and means for dedicating one of said channels to the broadcast service at only those base stations which receive one or more responses to the paging signal, each mobile unit of the selected group having means for transmitting such a response to the paging signal.

2. A cellular radio system comprising:

a switching center and a plurality of radio base stations, each having an associated plurality of traffic channels for serving an associated cell, a plurality of mobile units, each of a plurality of the radio base stations having at least one of its associated channels capable of being dedicated to a broadcast service, a selected group of at least some of the mobile units each having means for establishing the channel associated with the broadcast service, so that a call from the switching center can be transmitted by one of said base stations over the channel associated with the broadcast service to the selected group of mobile units within the cell, each base station including means for transmitting a paging signal and means for dedicating one of said channels to the broadcast service at only those base stations which receive one or more responses to the paging signal, each mobile unit of the selected group having means for transmitting such a response to the paging signal, means for repeating the paging signal periodically throughout a broadcast, and wherein in each cell, one of said channels continues to be dedicated to the broadcast service only if one or more of the mobile units continue to respond to the repeated paging signal in that cell.

3. A cellular radio system as in claim 1 or 2 in which each base station has means for transmitting over a control channel the identity of the channel dedicated to the broadcast service.

4. A cellular radio system as in claim 1 or 2 in which a broadcast may be initiated from one of the mobile units.

5. A cellular radio system as in claim 4 comprising means for initiating a broadcast transmission on a duplex channel from a mobile unit using an uplink part of the duplex channel dedicated to the broadcast service.

6. A cellular radio system comprising:

a switching center and a plurality of radio base stations, each having an associated plurality of traffic channels for serving an associated cell, a plurality of mobile units, each of a plurality of the radio base stations having at least one of its associated channels capable of being dedicated to a broadcast service, a selected group of at least some of the mobile units each having means for establishing the channel associated with the broadcast service, so that a call from the switching center can be transmitted by one of said base stations over the channel associated with the broadcast service to the selected group of mobile units within the cell, each base station including means for transmitting a paging signal and means for dedicating one of said channels to the broadcast service at only those base stations which receive one or more responses to the paging signal, each mobile unit of the selected group having means for transmitting such a response to the paging signal, means for repeating the paging signal periodically throughout a broadcast, wherein in each cell, one of said channels continues to be dedicated to the broadcast service only if one or more of the mobile units continue to respond to the repeated paging signal in that cell, and wherein during a broadcast, if a response to a paging signal is received from a mobile unit in a cell in which no one of said channels is currently dedicated to the broadcast service, one of said channels is then dedicated to the broadcast service in that cell.

7. A cellular radio system comprising:

a switching center and a plurality of radio base stations each having an associated plurality of traffic channels for serving an associated cell, a plurality of mobile units, each of a plurality of the radio base stations having at least one of its associated channels capable of being dedicated to a broadcast service, and a selected group of at least one of the mobile units each having means for identifying the channel associated with the broadcast service and switching to reception on the said channel when a broadcast is transmitted, so that a call from the switching center is transmitted by one of said base stations over the channel associated with the broadcast service to the selected group of mobile units within the cell, each base station including means for transmitting a paging signal, each mobile unit of the selected group including means for transmitting a response to the paging signal, and means at each base station for dedicating a channel to the broadcast service at only those base stations which receive one or more such responses, wherein if one or more mobiles respond to a page in one of said associated cells which no one of said channels is free, one of said channels is seized from an existing call.

8. A cellular radio system as in claim 7 having means for transmitting a warning message to the parties to the existing call before one of said channels is seized.

9. A cellular radio system comprising:

a switching center and a plurality of radio base stations, each having an associated plurality of traffic channels for serving an associated cell, a plurality of mobile units, each of a plurality of the radio base stations having at least one of its associated channels capable of being dedicated to a broadcast service, and a selected group of at least some of the mobile units each having means for establishing the channel associated with the broadcast service, so that a call from the switching center can be transmitted by one of said base stations over the channel associated with the broadcast service to the selected group of mobile units within the cell, each base station including means for transmitting a paging signal as part of an initial call set-up and handover process and means for dedicating one of said channels to the broadcast service at only those base stations which receive one or more responses to the paging signal, each mobile unit of the selected group having means for transmitting such a response to the paging signal, wherein if one or more mobiles respond to a page in one of said associated cells which no one of said channels is free, one of said channels is seized from an existing call.

10. A cellular radio system as in claim 9 having means for transmitting a warning message to the parties to the existing call before one of said channels is seized.

11. A cellular radio system comprising:

a switching center and a plurality of radio base stations each having an associated plurality of traffic channels for serving an associated cell, a plurality of mobile units, each of a plurality of the radio base stations having at least one of its associated channels capable of being dedicated to a broadcast service, and a selected group of at least some of the mobile units each having means for identifying the channel associated with the broadcast service and switching to reception on the said channel when a broadcast is transmitted, so that a call from the switching center is transmitted by one of said base stations over the channel associated with the broadcast service to the selected group of mobile units within the cell, each base station including means for transmitting a paging signal, each mobile unit of the selected group including means for transmitting a response to the paging signal, means at each base station for dedicating a channel to the broadcast service at only those base stations which receive one or more such responses, and means for repeating the paging signal periodically throughout a broadcast, wherein if one or more mobiles respond to a page in one of said associated cells which no one of said channels is free, one of said channels is seized from an existing call.

12. A cellular radio system as in claim 11 having means for transmitting a warning message to the parties to the existing call before one of said channels is seized.

13. A cellular radio system comprising:

a switching center and a plurality of radio base stations, each having an associated plurality of traffic channels for serving an associated cell, a plurality of mobile units, each of a plurality of the radio base stations having at least one of its associated channels capable of being dedicated to a broadcast service, a selected group of at least some of the mobile units each having means for establishing the channel associated with the broadcast service, so that a call from the switching center can be transmitted by one of said base stations over the channel associated with the broadcast service to the selected group of mobile units within the cell, each base station including means for transmitting a paging signal and means for dedicating one of said channels to the broadcast service at only those base stations which receive one or more responses to the paging signal, each mobile unit of the selected group having means for transmitting such a response to the paging signal, means for repeating the paging signal periodically throughout a broadcast, and wherein in each cell, one of said channels continues to be dedicated to the broadcast service only if one or more of the mobile units continue to respond to the repeated paging signal in that cell, wherein if one or more mobiles respond to a page in one of said associated cells which no one of said channels is free, one of said channels is seized from an existing call.

14. A cellular radio system as in claim 13 having means for transmitting a warning message to the parties to the existing call before one of said channels is seized.

* * * * *